United States Patent [19]

Protz, Jr.

[11] Patent Number: 5,624,091
[45] Date of Patent: Apr. 29, 1997

[54] SUCTION CUP AND HANGER

[75] Inventor: William F. Protz, Jr., Lake Forest, Ill.

[73] Assignee: Santa's Best, Northfield, Ill.

[21] Appl. No.: 555,152

[22] Filed: Nov. 8, 1995

Related U.S. Application Data

[63] Continuation-in-part of Ser. No. 386,076, Feb. 9, 1995.
[51] Int. Cl.$^6$ .................................................. A45D 42/14
[52] U.S. Cl. ........................... 248/205.5; 248/206.2
[58] Field of Search ...................... 248/205.5, 206.1, 248/206.2, 301, 303, 309

[56] References Cited

U.S. PATENT DOCUMENTS

| | | | |
|---|---|---|---|
| 979,436 | 12/1910 | Corbin | 248/205.5 |
| 1,632,856 | 6/1927 | Running | 248/205.5 |
| 2,202,242 | 5/1940 | Wortham | 248/205.5 |
| 5,028,026 | 7/1991 | Philipps et al. | 248/206.2 |

FOREIGN PATENT DOCUMENTS

| | | | |
|---|---|---|---|
| 694654 | 9/1965 | Italy | 248/206.1 |
| 5220042 | 8/1993 | Japan | 248/205.5 |
| 441647 | 1/1968 | Switzerland | 248/206.1 |

*Primary Examiner*—Leslie A. Braun
*Assistant Examiner*—Willie Berry, Jr.
*Attorney, Agent, or Firm*—Emrich & Dithmar

[57] ABSTRACT

A suction cup and hanger combination. The combination has suction cup with a flexible cup shaped member and mounting button or nub on one end thereof. A hanger having a hook at one end and mechanism at the other end for detachably mounting the hanger on the suction cup mounting button or nub. The hanger hook is laterally offset to position at least a portion of the hook substantially vertically under the suction cup mounting button or nub. The hook may have a bottom surface which is slanted to ensure that any ornament hung on the hook is vertically below the button or nub.

16 Claims, 1 Drawing Sheet

SUCTION CUP AND HANGER

BACKGROUND OF THE INVENTION

This invention is a continuation-in-part of Ser. No. 08/386,076, filed Feb. 9, 1995 and relates to combination devices for holding decorative ornaments or other objects, and more particularly, to a decorative ornament and support assembly particularly adapted to be mounted on a relatively smooth, substantially planar vertical surface such as glass or wood.

U.S. Pat. No. 5,1210,078 issued to Gary, May 5, 1992 discloses a device for mounting a decorative light support assembly to a planar surface using a suction cup in a two-part combination. The Gary patent references a large number of patents and devices disclosed by Gary to this same general subject matter which are listed in the references on the front page of the '078 patent. A copy of that patent is submitted herewith in the enclosed Information Disclosure Statement.

Nevertheless, while the Gary patent may show a device which is satisfactory for its intended purpose, there is an inherent difficulty with the device of the Gary patent relating to the moment created by the construction between the suction cup there disclosed and the weight supported by the clip portion of the Gary device. This moment multiplied by the weight of the decorative light creates a force which tends to break the suction between the cup and the planar support surface, thereby rendering the device ineffective.

The Gary patent also illustrates the advantage of suction cups over mounting devices including adhesive pads, screw type fasteners, or the like for securing support brackets to substantially planar surfaces. Adhesive pads as well as the other above-mentioned type fasteners leave evidence of their presence ranging from adhesive residue to actual holes in the surface. All of these objections are obviated by the use of suction cups for mounting devices to flat planar surfaces.

SUMMARY OF THE INVENTION

According to the present invention, a suction cup and hanger combination is provided that comprises a suction cup member and a hanger member. The suction cup member is preferably molded from a flexible polymeric material such as a rubber or rubber modified plastic and the hanger is preferably molded from an injection moldable thermal plastic resin which may be an acrylic resin, a polycarbonate resin or any other suitable synthetic organic resin.

A principal object of the invention is to provide a combination in which the item to be hung from the hanger is as close to possible to be in vertical alignment with the rear portion of the suction cup in order to minimize the turning moment generated by the configuration, thereby reducing the force which pulls the suction cup from the support surface and tends to break the suction.

Another object of the invention is to provide a suction cup and hanger combination wherein the low turning moment is achieved by a concave frame member which positions the juncture of the hook and frame in contact with the vertical support surface or in contact with the suction cup mounted hereon.

Yet another object of the invention is to provide a construction which is relatively inexpensive to make, yet performs its purpose in a superior manner than assemblies hereto commercially available.

The invention consists of certain novel features and a combination of parts hereinafter fully described illustrated in the accompanying drawings and particularly pointed out in the appended claims it being understood that various changes in the details may be made without departing from the spirit or sacrificing any of the advantages of the present invention.

DESCRIPTION OF THE PREFERRED EMBODIMENT

Figure 1:
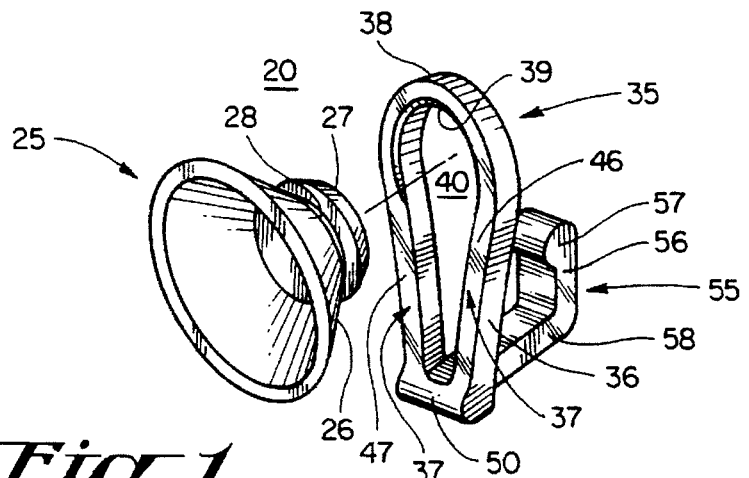
FIG. 1 is an exploded perspective view of the suction cup and hanger which forms the combination of the present invention.

Referring to the drawings, there is disclosed a combination device 20 which includes a suction cup 25 and a hanger 35. The suction cup 25 includes the usual flexible cup portion 26 having a boss 27 extending rearwardly of the cup portion 26. The boss 27 defines a circular groove 28 with the back of the flexible cup portion 26, as best seen in FIG. 1.

Figures 2, 3, 4:
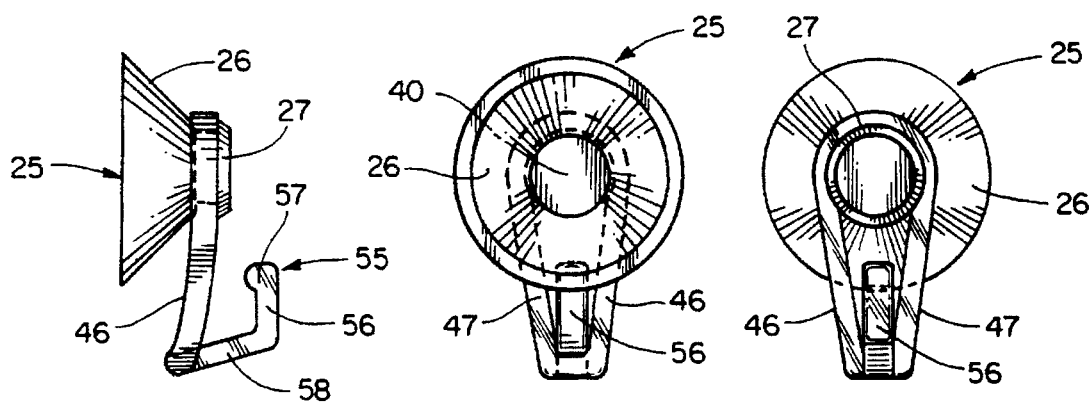
FIG. 2 is a side elevational view of the combination shown in FIG. 1 in the assembled condition thereof.
FIG. 3 is a front elevational view of the hanger illustrated in FIG. 4.
FIG. 4 is a rear elevational view of the hanger illustrated in FIG. 2.
Figures 5, 6:
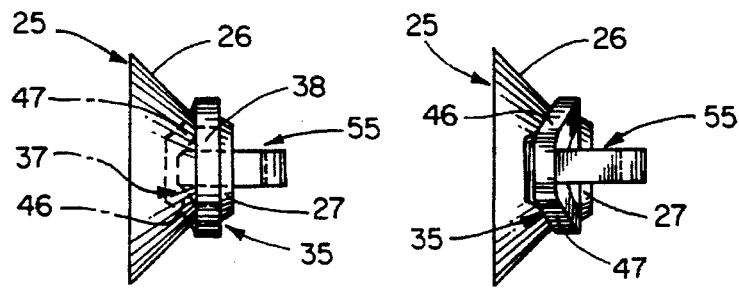
FIG. 5 is a top elevational view of the hanger illustrated in FIG. 2.
FIG. 6 is a bottom elevational view of the hanger illustrated in FIG. 2.

The hanger 35 includes a pair of spaced apart long arm portions 37 and side surface 36 which extend vertically upwardly and outwardly and terminate at the top in an arcuate mounting portion 38. The arcuate mounting portion 38 has an arcuate offset portion 39 for receiving therein the suction cup 25, as best seen in FIG. 2. The arms 37 and side surface 36 along with the arcuate portion 38 define an ovate opening 40 closed by a bottom portion 50. The arms 37 and side surface 36 have, respectively, concave inner surfaces 46 and 47. The hanger construction 35 is completed by hook 55 having a generally vertical portion 56 terminating in a nub 57. The hook 55 also has an angularly disposed or slanted portion 58 which terminates at the bottom 50. The slanted portion 58 is higher at the intersection with vertical portion 56 than at the juncture with the bottom 50 interconnecting the arms 37 and side surface 36, thereby forming an acute angle with the arms for a purpose to be explained.

As may be seen from the drawings, the interconnection of the slanted support portion 58 with the arms 37 and side surface 36 adds rigidity to the hanger 35 and maintains an ornament in contact therewith positioned toward the arms 37 and side surface 36. The concave shape of arms 36 and 37 serve to position the arms 37 and side surface 36 very close to the planar support surface to which the suction cup 25 is mounted so as to reduce and substantially eliminate any movement generated due to the horizontal distance between the support surface to which the suction cup 25 is mounted and the center of gravity of an ornament or the like which is hung on the hook 55.

Another feature of the invention is the boss 27 extending rearwardly of the suction cup 25 facilitating an easy exchange of hangers 35 when it is desired to provide hangers of somewhat different geometries. The hanger 35 may be made longer than shown and the suction cup 25 may be larger than illustrated. Usually, the bottom 50 of the hanger 35 will be in contact with a support surface or in contact with the flexible portion 26 of the suction cup 25 to reduce the turning moment generated by the weight of an ornament on the hook 55.

Preferably, the hanger 35 may be made of a suitable synthetic organic resin such as an acrylic or carbonate material or for that matter nylon, polyethylene or various mixtures thereof. It is important that the synthetic organic resin of the hanger 35 have sufficient strength to carry whatever ornament is eventually hung onto the hook portion 55. The nub 57 serves to retain the item held on the hook 55 in place. This can be garland or an ornament. Any type or variety of objects can be hung on the hook 55 if desired, it being immaterial to the scope of the invention.

While there has been disclosed what is considered to be the preferred embodiment of the present invention it is understood that various changes in the details may be made without departing from the spirit or sacrificing any of the advantages of the present invention.

I claim:

1. A suction cup and hanger combination, comprising a suction cup having a flexible cup shaped member with mounting means on one end thereof, an elongated hanger member having a hook at one end and mechanism including spaced apart concave arms forming an arcuate opening at the other end for loosely and detachably mounting said hanger member on said suction cup mounting means, said flexible cup shaped member being adapted to be mounted on a vertical support surface with the juncture of said hanger member and said hook being positioned either in contact with the vertical support surface on which the suction cup is mounted or the flexible cup shaped member of said suction cup.

2. The combination of claim 1, wherein said hook forms an acute angle with said spaced-apart concave arms of said elongated member, thereby urging articles hung on said hook toward the juncture of said hook with said spaced arms.

3. The combination of claim 1, wherein said hanger is a one-piece synthetic organic resin.

4. The combination of claim 3, wherein said resin is a polycarbonate.

5. The combination of claim 3, wherein said resin is a polyacrylic.

6. The combination of claim 3, wherein said resin is a nylon.

7. The combination of claim 3, wherein said resin is a polyethylene or a polypropylene or mixtures thereof.

8. A one-piece hanger for use with a suction cup for mounting on a vertical support surface, said one-piece hanger having a frame defining an opening at one end for detachably mounting a suction cup to said one-piece hanger and a hook at the other end, said frame including a pair of concave arms forming an ovate opening at one end connected to said hook to position the juncture of said hook and said concave member closer to the vertical support surface than the opening at the one end of said hanger frame.

9. The hanger of claim 8, wherein said pair of concave arms are integral with said hook at the other end of said frame, said hook forming an acute angle with said concave arms at the juncture between said frame and said hook.

10. The hanger of claim 8, wherein said hanger is a one-piece synthetic organic resin.

11. The hanger of claim 10, wherein said synthetic organic resin is one or more of a polycarbonate, a polyacrylic, a nylon, a polyethylene and a polypropylene.

12. A hanger for use with a suction cup for mounting the hanger on a vertical support surface, said hanger comprising an ovate portion integral with a hook extending away from the ovate portion at the bottom thereof, the top of the ovate portion being constructed to receive therein a suction cup for mounting said hanger to a vertical support surface, the surface of said ovate portion facing the vertical support surface being concave to position the juncture of the bottom of the ovate portion and the hook closer to the vertical support surface than the top of the ovate portion to reduce the force moment when a load is mounted on the hook.

13. The hanger of claim 12, wherein said hook forms an acute angle with said ovate portion, thereby to urge articles hung from said hook toward the juncture between said ovate portion and said hook.

14. The hanger of claim 13, wherein the top of said ovate portion has a surface facing away from said hook, said surface having an undercut portion for receiving a portion of a suction cup therein for mounting said hanger to a vertical support surface.

15. The hanger of claim 14, wherein said hanger is an integral one-piece structure.

16. The hanger of claim 15, wherein said one-piece structure is a synthetic organic resin of one or more of a polycarbonate, a polyacrylic, a nylon, a polyethylene and a polypropylene.

* * * * *